United States Patent [19]

Sherman

[11] Patent Number: 4,724,042

[45] Date of Patent: Feb. 9, 1988

[54] DRY GRANULAR COMPOSITION FOR, AND METHOD OF, POLISHING FERROUS COMPONENTS

[76] Inventor: Peter G. Sherman, Suite 400, 1130 E. Third St., Charlotte, N.C. 28204-2660

[21] Appl. No.: 934,469

[22] Filed: Nov. 24, 1986

[51] Int. Cl.$^4$ .................. C23F 1/00; C23F 1/28; C09K 13/00

[52] U.S. Cl. .................. 156/637; 156/642; 156/645; 156/664; 156/903; 252/79.1; 252/79.4; 252/100; 252/136; 148/6.14 A; 148/6.15 R

[58] Field of Search ............ 252/79.1, 79.2, 79.4, 252/100, 136, 142; 156/637, 639, 642, 645, 664, 903; 148/6.14 A, 6.15 R

[56] References Cited

U.S. PATENT DOCUMENTS

| | | | |
|---|---|---|---|
| 2,666,000 | 1/1954 | DeHoff | 252/100 |
| 2,890,944 | 6/1959 | Hays | 156/664 X |
| 2,940,838 | 6/1960 | Snyder et al. | 156/664 X |
| 2,981,610 | 4/1961 | Snyder et al. | 156/664 X |
| 3,052,582 | 9/1962 | Snyder | 156/664 |
| 3,061,494 | 10/1962 | Snyder et al. | 156/664 |
| 3,094,489 | 6/1963 | Barnes | 252/79.2 |
| 4,086,176 | 4/1978 | Ericson et al. | 252/79.4 X |
| 4,491,500 | 1/1985 | Michaud et al. | 156/664 X |
| 4,532,066 | 7/1985 | Paszek et al. | 252/144 |

Primary Examiner—S. Leon Bashore
Assistant Examiner—Andrew J. Anderson
Attorney, Agent, or Firm—Daniel E. McConnell

[57] ABSTRACT

Compositions and methods of using the compositions in preparing ferrous metal components for subsequent surface electroplating by preparing a solution containing an acid and a sequestering agent, immersing the components and abrading media in the solution, and agitating the components and the abrading media while maintaining the components and the media immersed in the solution. The compositions are dry granular compositions. Specific formulations are set out in detail. Generally, each composition has, by defined weight percents, oxalic acid; a phosphorus sequestering agent; the ratio by weight of oxalic acid to sequestering agent being in a range of from about 2:1 to about 0.4:1; a quantity of an ammonifying agent sufficient and effective for adjusting the pH of the solution formed on dissolving the composition in water to about 3.5; a quantity of a surfactant sufficient and effective for accomplishing wetting of the composition; and a quantity of a carrier material which may be a granular absorbent sufficient to make up the remainder of the composition.

14 Claims, No Drawings

DRY GRANULAR COMPOSITION FOR, AND METHOD OF, POLISHING FERROUS COMPONENTS

FIELD AND BACKGROUND OF INVENTION

This invention relates to compositions and methods of using the compositions in preparing ferrous metal components for subsequent surface electroplating by preparing a solution containing an acid and sequestering agents, immersing the components and abrading media in the solution, and agitating the components and the abrading media while maintaining the components and the media immersed in the solution. Similar technology has been known heretofore from such disclosures as Hays U.S. Pat. No. 2,890,944; a series of United States Patents to Herman Ben Snyder including U.S. Pat. Nos. 2,940,838; 2,981,610; 3,052,582; and 3,061,494; and Michaud et al U.S. Pat. No. 4,491,500.

In accordance with the improvements of the present invention, the compositions are in dry granular form. In dry granular form, the composition has, by weight percent, up to about 40% of oxalic acid crystals; up to about 30% of a crystalline phosphorus sequestering agent; the ratio by weight of oxalic acid crystals to sequestering agent crystals being in a range of from about 2:1 to about 0.4:1; a quantity of a liquid amine ammonifying agent sufficient and effective for adjusting the pH of the solution formed on dissolving the composition in water to about 3.5; a quantity of a non-foaming non-ionic surfactant sufficient and effective for accomplishing wetting of the composition; and a quantity of a granular absorbent sufficient to make up the remainder of the composition and effective to absorb said liquid amine ammonifying agent and serve as a carrier therefor.

It has been known heretofore in the manufacture of ferrous metal components that electroplating of such components may serve the dual functions of protecting the ferrous material against rust or other deterioration and enhancing appearance. For such reasons, it is commonly done to plate hand tools such as wrenches and the like with bright electroplate finishes. In preparing components for such finishing, it is important that the surfaces to be plated have a certain degree of smoothness for appearance sake, and sometimes important that they be polished. While such polishing has been done in a number of different ways, chemical processes for metal removal have achieved some success and acceptance, and have followed generally the teachings of the prior patents listed above.

In processes of the type described, there is a constant balancing of harshness against productivity. In attempts to achieve high productivity of components and short cycle times for the use of equipment, some users have attempted the use of strongly acidic solutions. In attempts to achieve desirable surface finishes, other users have attempted the use of less acidic solutions. In both instances, problems may be encountered with exhaustion of solutions used and effluents created. Attempts at prolonging the usefulness of solutions have involved the use of sequestering agents to avoid exhaustion of working solutions.

BRIEF DESCRIPTION OF INVENTION

Having in mind the efforts made in the past and the problems encountered, it is an object of this invention to achieve chemically smoothed surfaces for receiving bright electroplated finishes in an optimal processing time and with minimal undesirable effluent. In realizing this object of the invention, a process of the general type briefly described hereinabove is improved by the use of an organic acid solution which achieves controlled metal removal at a desirable rate. Production capabilities using the solution contemplated by this invention are better than those accomplished using the harsher solutions previously used, while the effluent from the process more nearly approaches a chemically neutral waste.

Yet another object of this invention is to provide compositions which may be formulated and handled as a dry granular material, then mixed with water to provide the necessary working solution as needed. In realizing this object of the invention, the handling and preparation of the working chemicals used in the process briefly described hereinabove is simplified for those users who may prefer a dry granular material for that purpose.

DETAILED DESCRIPTION OF INVENTION

Some of the objects of the invention having been stated, other objects will appear as the description proceeds. While the present invention will be described more fully hereinafter, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Stated generally, the compositions contemplated by the present invention are dry granular compositions, which are adapted to be mixed with water and used in a wet process abrasive finishing apparatus for ferrous metals, such as a tumbling barrel or the like. The dry composition comprises, by weight percent, up to about 40% of oxalic acid crystals; up to about 30% of a crystalline phosphorus sequestering agent; the ratio by weight of oxalic acid crystals to sequestering agent crystals being in a range of from about 2:1 to about 0.4:1; a quantity of a liquid amine ammonifying agent sufficient and effective for adjusting to about 3.5 the pH of the solution formed on dissolving the composition in water; a quantity of a non-foaming non-ionic surfactant sufficient and effective for accomplishing wetting of the composition; and a quantity of a granular absorbent sufficient to make up the remainder of the composition and effective to absorb said liquid amine ammonifying agent and serve as a carrier therefor.

The phosphorus sequestering agent may be any of the inorganic phosphates which display the characteristic of sequestering ferrous metal ions, and/or many of the organic phosphates which display such characteristics. Those which have been found to perform better in the compositions of this invention are pyrophosphates, tripolyphosphates, and phosphonates. That which is most preferred is tetrasodium pyrophosphate.

The buffering and/or ammonifying agent(s) may be any ammonia releasing or generating material which will have the effect of moderating the pH of the solution. It has been determined that the combined effect of the acid constituent in removing metal and the sequestering agent in holding metal ions in solution and preventing their re-deposition onto the components in a plating type process is pH dependent, and will not start and/or proceed properly at pH levels below about 3.5. Thus it is important, in the compositions and methods contemplated by this invention, to control that factor. A preferred material to accomplish such control is monoethanolamine. Monoethanolamine is a liquid, and in order to accomplish its use in a dry granular material as contemplated by this invention it is necessary to incorporate a carrier for the liquid. That is done by use of an absorbent, and a preferred material is diatomaceous earth, which is essentially chemically inert for purposes of the present composition and methods using the composition.

In order to assure that the compositions of this invention more easily enter solution with water which mixed for use. It is desirable to incorporate a wetting agent in the form of a surfactant. A preferred surfactant is a non-foaming, nonionic material, and it is further preferred that such material be of a low HLB type.

The ratio of oxalic acid to sequestering agent is significant in balancing speed of metal removal to accomplish surface finishing against etching from excessively aggressive metal removal inasmuch as both the materials used contribute to metal removal. Experimentation with variations in the ratio of acid to sequestering agent have shown that, as a general matter, increasing the quantity of sequestering agent in relation to acid increases the speed of metal removal and also increases the likelihood that metal removal causes a distinctive "frosty" appearance which is deemed etching and which experience has shown must be polished before satisfactory plating can be accomplished. While the mechanism leading to such results is perhaps not fully understood, it is believed likely that the varying concentrations cause varying rates of effectiveness of metal removal in the microscopic level "peaks and valleys" or roughnesses of the components. Where metal removal is essentially the same in both areas, a frosty finish results. Where metal removal occurs more heavily at the peaks, a greater smoothness is achieved and the finished component is more acceptable. Depending in part upon the specific ferrous alloy being worked, ratios of acid to agent in the range of from about 2 parts to 1 part to about 0.3 part to 1 part have been found acceptable and are contemplated by this invention. A preferred range is about 1.4 parts to 1 part.

In use, the compositions of this invention may be used in any known type of wet abrasive finishing equipment capable of withstanding the corrosive effects of the dispersions which result. Examples of such equipment are listed in the prior patents listed above, and may include open and closed tumbling barrels, spinning machines, vibrating machines, and spindle machines. Such equipment may be capable of batch processing, continuous or flow through processing, or both. Solutions used may be batched or recirculated. The choice of such equipment is left to the skill of the person skilled in the applicable arts and learning of this invention. However, as brought out more fully hereinafter, a preferred process uses apparatus arranged for recirculation of the solution.

As briefly mentioned above, a method of preparing ferrous metal components for subsequent surface electroplating in accordance with this invention includes the known steps of preparing a solution containing an acid and a sequestering agent, immersing the components and abrading media in the solution, and agitating the components and the abrading media while maintaining the components and the media immersed in the solution.

It is to be noted that an apparent factor in the successful operation of compositions as contemplated by this invention arises out of the differing solubilities of sodium and ammonium oxalates and the ferric/ferrous sodium/ammonium oxalates formed when the compositions are added to the treatment vessels in which ferrous components are being finished. The latter materials are significantly more highly soluble in water, contributing to the finishing action sought and accomplished by this invention.

The improvement contemplated by this invention, as practiced using the dry granular composition, comprises the steps of preparing a solution by mixing with water from about 8 ounces to about 12 ounces per gallon of water of the dry granular composition described above, monitoring the pH level of the solution during agitation of the components and abrading media, and responding to monitored pH levels by adding an alkali and thereby adjusting the pH levels of the solution to maintain such pH within a range of from about 4.5 to about 5.0 throughout agitation of the components and abrading media. Preferably the agitation continues until such time as a soft blackish film has formed on the surface of the ferrous components. Experimentation has determined that optimum productivity is achieved with a recirculating type of process and with the solution recirculating at a flow rate in the range of from about 0.25 to about 1.0 gallons per hour per cubic foot of volume in the vessel occupied by the dispersion, components and abrading media.

Certain experiments conducted in the development of this invention are reflected in the following examples.

EXAMPLE 1

Using a laboratory size closed barrel tumbler and a small lot of sockets for socket wrenches, a solution of water and a dry granular composition was prepared. The composition contained equal parts by weight of oxalic acid crystals and phosphate, and was mixed with water in a ratio of 8 ounces to a gallon of water. Ordinary household cleaning ammonia was added to the solution in a quantity sufficient to adjust the pH to about 4. The ferrous metal components were tumbled for 8 hours, removed and washed. It was observed that surfaces of the sockets were smoothed and that a gray film had developed on the surfaces. The sockets were deemed to have surfaces acceptable for plating.

EXAMPLE 2

Using the tumbler of Example 1 and a similar quanlity of ferrous metal components, a solution was prepared in a similar way using a ratio of oxalic acid to phosphate of 0.30:1. Ordinary household cleaning ammonia was used as an ammonifying agent. The components processed were found to have the frosty surface appearance deemed indicative of improper metal removal. While acceptable for plating, the plated components were less attractive visually than those of Example 1.

EXAMPLE 3

A dry granular composition was prepared using oxalic acid crystals and tetrosodium pyrophosphate in a ratio of 2:1. Monoethanolamine was blended with diatomaceous earth in a ratio of about 0.33:1 until the diatomaceous earth had taken up the liquid amine. The acid and phosphate were then blended with the amine carrier in a ratio of about 1.5:1 to form a dry granular composition. The dry granular composition of acid, phosphate, amine and carrier was then mixed with a water in a ratio of 12 ounces to each gallon of water and used in a commercial size vibratory bowl finishing apparatus to finish a large quantity of components. The components were processed for 4 hours, and were found to have an acceptable finish and a smutty black film.

EXAMPLE 4

A dry granular composition similar to that of Example 3 was prepared, with the addition of about 1% by weight of a non-foaming nonionic surfactant. The composition was mixed with water in a ratio of 10 ounces to each gallon of water. It was observed that mixing of the liquid finishing composition was improved over the composition of Example 3. The finishing mixture was used in an open tumbler barrel, recirculating flow system to process hand tools. It was observed that metal removal began after about fifteen minutes and that a satisfactory surface finish was achieved in about 6 hours time.

EXAMPLE 5

A dry granular composition was prepared using oxalic acid crystals and tetrosodium pyrophosphate in a ratio of 1.4:1. Monoethanolamine was blended with diatomaceous earth in a ratio of about 0.4:1 until the diatomaceous earth had taken up the liquid amine. The acid and phosphate were then blended with the amine carrier in a ratio of about 1.5:1 to form a dry granular composition. The dry granular composition of acid, phosphate, amine and carrier was then mixed with water in a ratio of 10 ounces to each gallon of water and used in a commerical size vibratory bowl finishing apparatus with recirculating flow to finish a large quantity of components. The components were processed for 5 hours, with a recirculating flow rate of 0.8 gallons per hour per cubic foot of machine capacity and were found to have an acceptable finish and a smutty black film.

While the examples here included will reflect the parameters varied in experimentation done during development of the present invention, the forms of the present invention preferred at the writing of this description are a dry granular composition which has as its constituents, by weight: 35% Oxalic acid crystals; 28% an absorbent for a liquid ammonifying agent, preferably diatomaceous earth; 25% crystalline phosphorus, preferably tetrasodium pyrophosphate; 11% ammonifying agent, preferably monoethanolamine; and 1% non-foaming nonionic surfactant.

In the specifications there have been set forth preferred embodiments of the invention and, although specific terms are used, the description thus given uses terminology in a generic and descriptive sense only and not for purposes of limitation.

What is claimed is:

1. A composition adapted to be mixed with water and used in a wet process abrasive finishing apparatus for ferrous metals, such as a tumbling barrel or the like, and comprising, by weight percent; up to about 40% oxalic acid; up to about 30% of a phosphorus sequestering agent; the ratio by weight of oxalic acid to sequestering agent being in a range of from about 2:1 to about 0.4:1; a quantity of an ammonifying agent sufficient and effective for adjusting the pH of the solution formed on dissolving the composition in water to a range of from about 3.5 to about 6.5: a quantity of a surfactant sufficient and effective for accomplishing wetting of the composition; and a quantity of a carrier material sufficient and effective to make up the remainder of the composition and effective to maintain the constitutents of the composition in a readily handled dry granular form.

2. A composition according to claim 1 wherein the ammonifying agent is a liquid amine and said carrier material is a granular absorbent effective to absorb said liquid amine ammonifying agent and serve as a carrier therefor.

3. A dry granular composition adapted to be mixed with water and used in a wet process abrasive finishing apparatus for ferrous metals, such as a tumbling barrel or the like, and comprising, by weight percent; up to about 40% of oxalic acid crystals; up to about 30% of a crystalline phosphorus sequestering agent; the ratio by weight of oxalic acid crystals to sequestering agent crystals being in a range of from about 2:1 to about 0.4:1; a quantity of a liquid amine ammonifying agent sufficient and effective for adjusting to about 3.5 the pH of the solution formed on dissolving the composition in water; a quantity of a surfactant sufficient and effective for accomplishing wetting of the composition; and a quantity of a granular absorbent sufficient to make up the remainder of the composition and effective to absorb said liquid amine ammonifying agent and serve as a carrier therefor.

4. A dry granular composition adapted to be mixed with water and used in a wet process abrasive finishing apparatus for ferrous metals, such as a tumbling barrel or the like, and consisting essentially of, by weight percent; up to about 2% of a surfactant; from about 50% to about 65% of a mixture of oxalic acid crystals and a crystalline phosphorus sequestering agent selected from among the group consisting of pyrophosphates, tripolyphosphates, and phosphonates, with the ratio by weight of oxalic acid crystals to sequestering agent crystals being in a range of from about 2:1 to about 0.4:1; up to about 15% of a liquid amine ammonifying agent, the amount being sufficient and effective for adjusting the pH of the solution formed on dissolving the composition in water to a range of about 3.5 to about 6.5; and a quantity of a granular absorbent sufficient to make up the remainder of the composition and to absorb said liquid amine ammonifying agent and serve as a carrier therefor.

5. A composition according to one of claim 3 or claim 4 wherein said crystalline phosphorus sequestering agent is a pyrophosphate.

6. A composition according to claim 5 wherein said crystalline phosphorus sequestering agent tetrasodium pyrophosphate.

7. A composition according to one of claim 3 or claim 4 wherein said liquid amine ammonifying agent is monoethanolamine.

8. A composition according to one of claim 3 or claim 4 wherein said absorbent is diatomaceous earth.

9. A dry granular composition adapted to be mixed with water and used in a wet process abrasive finishing apparatus for ferrous metals, such as a tumbling barrel or the like, and consisting essentially of, by weight percent, up to about 2% of a non-foaming low HLB nonionic surfactant; from about 50% to about 65% of a mixture of oxalic acid crystals and tetrasodium pyrophosphate, with the ratio by weight of oxalic acid crystals to tetrasodium pyrophosphate being in a range of from about 2:1 to about 0.4:1; up to about 15% of monoethanolamine, the amount being sufficient and effective for adjusting the pH of the solution formed on dissolving the composition in water to a range of about 3.5 to about 6.5; and a quantity of diatomaceous earth sufficient to make up the remainder of the composition and to absorb said monoethanolamine and serve as a carrier therefor.

10. In a method of preparing ferrous metal components for subsequent surface electroplating which includes the steps of preparing a dispersion containing an acid and a sequestering agent, immersing the components and abrading media in the dispersion, and agitating the components and the abrading media while maintaining the components and the media immersed in the dispersion, the improvement comprising the steps: of preparing the dispersion by mixing with water from about 8 ounces to about 12 ounces per gallon of water of a dry granular composition which comprises, by weight percent, up to about 40% of oxalic acid crystals; up to about 30% of a crystalline phosphorus sequestering agent; the ratio by weight of oxalic acid crystals to sequestering agent crystals being in a range of from about 2:1 to about 0.4:1; a quantity of a liquid amine ammonifying agent sufficient and effective for adjusting the pH of the solution formed on dissolving the composition in water to about 3.5; a quantity of a surfactant sufficient and effective for accomplishing wetting of the composition; and a quantity of a granular absorbent sufficient to make up the remainder of the composition and effective to absorb said liquid amine ammonifying agent and serve as a carrier therefor; monitoring the pH level of the dispersion during agitation of the components and abrading media; and responding to monitored pH levels by adding an alkali and thereby adjusting the pH level of the dispersion to maintain such pH within a range of from about 3.5 to about 7.0 throughout agitation of the components and abrading media.

11. In a method of preparing ferrous metal components for subsequent surface electroplating which includes the steps of preparing a dispersion containing an acid and a sequestering agent, immersing the components and abrading media in the dispersion, and agitating the components and the abrading media while maintaining the components and the media immersed in the dispersion, the improvement comprising the steps of: preparing the dispersion by mixing with water from about 8 ounces to about 12 ounces per gallon of water of a dry granular composition which consists essentially of, by weight percent, up to about 2% of a surfactant; from about 50% to about 65% of a mixture of oxalic acid crystals and a crystalline phosphorus sequestering agent selected from among the group consisting of pyrophosphates, tripolyphosphates, and phosphonates, with the ratio by weight of oxalic acid crystals to sequestoring agent crystals being in a range of from about 2:1 to about 0.4:1; up to about 15% of a liquid amine ammonifying agent the amount being sufficient and effective for adjusting the pH of the dispersion formed on mixing the composition with water to a range of about 3.5 to about 6.5; and a quantity of a granular absorbent sufficient to make up the remainder of the composition and to absorb said liquid amine ammonifying agent and serve as a carrier therefor; monitoring the pH level of dispersion during agitation of the components and abrading media; and responding to monitored pH levels by adding an alkali and thereby adjusting the pH level of the dispersion to maintain such pH within a range of from about 3.5 to about 7.0 throughout agitation of the components and abrading media.

12. In a method of preparing ferrous metal components for subsequent surface electroplating which includes the steps of preparing a dispersion containing an acid and a sequestering agent, immersing the components and abrading media in the dispersion, and agitating the components and the abrading media while maintaining the components and the media immersed in the dispersion, the improvement comprising the steps of: preparing the dispersion by mixing with water from about 8 ounces to about 12 ounces per gallon of water of a dry granular composition which consists essentially of, by weight percent, up to about 2% of a non-foaming low HLB non-ionic surfactant; from about 50% to about 65% of a mixture of oxalic acid crystals and tetrasodium pyrophosphate, with the ratio by weight of oxalic acid crystals tetrasodium pyrophosphate being in a range of from bout 2:1 to about 0.4:1, up to about 15% of monoethanolamine, the amount being sufficient and effective for adjusting the pH of the dispersion formed on mixing the composition with water to a range of about 3.5 to about 6.5; and a quantity of diatomaceous earth sufficient to make up the remainder of the composition and to absorb said monoethanolamine and serve as a carrier therefor; monitoring the pH level of the dispersion during agitation of the components and abrading media; and responding to monitored pH levels by adding an alkali and therby adjusting the pH level of the dispersion to maintain such pH within a range of from about 4.5 to about 5.0 throughout agitation of the components and abrading media.

13. A method according to one of claims 10, 11 or 12 wherein the improvement further comprises continuing the agitation of the components and abrading media until such time as a soft blackish film has formed on the surface of the ferrous components.

14. A method according to one of claims 10, 11 or 12 wherein the dispersion is recirculated through a vessel containing the components and abrading media and further wherein the improvement further comprises recirculating the dispersion at a flow rate in the range of from about 0.25 to about 1.0 gallons per hour per cubic foot of volume in the vessel occupied by the dispersion, components and abrading media.

* * * * *